US010916920B2

(12) United States Patent
Meyer et al.

(10) Patent No.: US 10,916,920 B2
(45) **Date of Patent: *Feb. 9, 2021**

(54) HOLDING ARRANGEMENT AND ARRANGEMENT OF AT LEAST TWO STACK SPARK GAPS

(71) Applicant: Phoenix Contact GmbH & Co. KG, Blomberg (DE)

(72) Inventors: Thomas Meyer, Ottenstein (DE); Hannes Sagebiel, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,689

(22) Filed: Aug. 2, 2019

(65) Prior Publication Data

US 2020/0044420 A1 Feb. 6, 2020

(30) Foreign Application Priority Data

Aug. 3, 2018 (DE) ........................ 10 2018 118 898

(51) Int. Cl.

| | |
|---|---|
| ***H02H 9/00*** | (2006.01) |
| ***H01T 4/18*** | (2006.01) |
| ***H01T 4/06*** | (2006.01) |
| ***H01T 4/02*** | (2006.01) |
| ***H01R 13/514*** | (2006.01) |
| ***H01R 13/70*** | (2006.01) |
| ***H01T 4/04*** | (2006.01) |
| *H01R 9/24* | (2006.01) |

(52) U.S. Cl.
CPC ............. *H01T 4/18* (2013.01); *H01R 13/514* (2013.01); *H01R 13/701* (2013.01); *H01T 4/02* (2013.01); *H01T 4/04* (2013.01); *H01T 4/06* (2013.01); *H01R 9/24* (2013.01)

(58) Field of Classification Search
None
See application file for complete search history.

(56) References Cited

U.S. PATENT DOCUMENTS

| | | |
|---|---|---|
| 3,665,255 A | 5/1972 | Jakszt et al. |
| 4,320,436 A | 3/1982 | Bushnell |

(Continued)

FOREIGN PATENT DOCUMENTS

| | | |
|---|---|---|
| DE | 202013102647 U1 | 6/2013 |
| DE | 102013113614 A1 | 6/2015 |

(Continued)

*Primary Examiner* — Stephen W Jackson
(74) *Attorney, Agent, or Firm* — David S. Safran; Roberts Calderon Safran & Cole, P.C.

(57) ABSTRACT

A holding arrangement for multiple electrodes, with at least two holding frames, which can be stacked flat one on top of another. With the holding arrangement, a large number of electrodes, which also form more than one stack spark gap, can be arranged especially simply relative to one another, such that, in the individual holding frames, in each case at least two recesses for accommodating one electrode per recess are formed next to one another, whereby the contour of the individual recesses is matched to the outside dimensions of the individual electrodes, and in that the individual holding frames can be connected to one another.

12 Claims, 5 Drawing Sheets

(56) References Cited

U.S. PATENT DOCUMENTS

| | | | |
|---|---|---|---|
| 4,645,941 A | 2/1987 | Nicolas | |
| 5,480,743 A * | 1/1996 | McCarter | H01M 6/34 429/100 |
| 10,263,229 B2 * | 4/2019 | Motokawa | H01M 10/617 |
| 2002/0048131 A1 | 4/2002 | Jakwani et al. | |
| 2004/0033707 A1 | 2/2004 | Ma et al. | |
| 2004/0160723 A1 | 8/2004 | Wittmann et al. | |
| 2008/0204963 A1 | 8/2008 | Baker et al. | |
| 2011/0019348 A1 | 1/2011 | Kludt et al. | |
| 2012/0067836 A1 | 3/2012 | MacKay et al. | |
| 2013/0182381 A1 | 7/2013 | Gray et al. | |
| 2013/0270408 A1 | 10/2013 | Schatzl | |
| 2013/0316567 A1 | 11/2013 | Sasano | |
| 2014/0204497 A1 | 7/2014 | Martinez Sanchez et al. | |
| 2014/0313631 A1 | 10/2014 | Mickievicz et al. | |
| 2015/0008108 A1 | 1/2015 | Wu et al. | |
| 2015/0126052 A1 | 5/2015 | Yamkovoy | |
| 2015/0349523 A1 | 12/2015 | Tsovilis et al. | |
| 2015/0362964 A1 | 12/2015 | Correll et al. | |
| 2016/0035529 A1 | 2/2016 | Durth | |
| 2016/0141858 A1 | 5/2016 | Hoffmann et al. | |
| 2016/0276821 A1 | 9/2016 | Politis et al. | |
| 2017/0077678 A1 | 3/2017 | Dorsch et al. | |
| 2017/0084368 A1 | 3/2017 | Johansson | |
| 2017/0117700 A1 | 4/2017 | Idota et al. | |
| 2017/0271785 A1 | 9/2017 | Do | |
| 2017/0301489 A1 | 10/2017 | Palvadi et al. | |
| 2017/0310023 A1 | 10/2017 | Trombley et al. | |
| 2017/0366000 A1 | 12/2017 | Igl et al. | |
| 2018/0068767 A1 | 3/2018 | Bockarev et al. | |
| 2020/0044419 A1 | 2/2020 | Meyer et al. | |
| 2020/0044420 A1 | 2/2020 | Meyer et al. | |
| 2020/0044442 A1 | 2/2020 | Meyer et al. | |
| 2020/0059089 A1 | 2/2020 | Li et al. | |
| 2020/0127443 A1 | 4/2020 | Dorsch et al. | |
| 2020/0185887 A1 | 6/2020 | Klinger et al. | |
| 2020/0185912 A1 | 6/2020 | Schork | |
| 2020/0279712 A1 | 9/2020 | He et al. | |
| 2020/0318674 A1 | 10/2020 | Axelsson et al. | |
| 2020/0328578 A1 | 10/2020 | Mayuzumi et al. | |

FOREIGN PATENT DOCUMENTS

| | | |
|---|---|---|
| DE | 202014101167 U1 | 6/2015 |
| DE | 102016114787 A1 | 5/2017 |
| WO | 2016169841 A1 | 10/2016 |
| WO | 2017080825 A1 | 5/2017 |

* cited by examiner

HOLDING ARRANGEMENT AND ARRANGEMENT OF AT LEAST TWO STACK SPARK GAPS

BACKGROUND OF THE INVENTION

Field of the Invention

The invention relates to a holding arrangement for multiple electrodes, with at least two holding frames, which can be stacked flat one on top of another. In addition, the invention also relates to an arrangement of at least two stack spark gaps, each of which has multiple electrodes and frame-like insulators that are arranged between the electrodes.

Description of the Related Art

Stack spark gaps, which are sometimes also referred to as multiple spark gaps, have been known for years. Such stack spark gaps consist of multiple electrodes and multiple insulators, which are arranged between the individual electrodes, so that an insulator, which has an opening in the center, is located in each case between two electrodes, so that two electrodes form a spark gap. In this case, the electrodes are in general designed as circular or rectangular graphite disks, between which correspondingly ring-shaped or frame-like insulators are then arranged. In this case, the insulators are often designed as thin insulating films made of plastic, for example, PTFE, and have a thickness of in general less than 1 mm.

From experience, various variants are known, such as ones in which the individual electrodes and the individual insulators can be connected to form a stack spark gap. Often, large-surface contact plates are used for this purpose, which plates form the front sides of the stack spark gaps and are twisted over multiple guide rods in the axial direction by being screwed together, so that the individual electrodes and the individual insulators are clamped in their stacklike arrangement between the contact plates. When the guide rods that are arranged between the contact plates are rerouted outside of the individual electrodes, this results in that the required installation space is relatively large.

A stack spark gap is known from German Utility Model DE 20 2013 102 647 U1, in which the installation space or space requirement is reduced in such a way that the individual electrodes are pierced in the center, and the contact plates that are arranged on the front sides of the stacked electrodes are connected to one another by a guide rod, which extends into the hole of the individual electrodes and the hole of the ring-shaped insulators. By using only one guide rod and its internal arrangement, a stack spark gap can be produced, whose space requirement is not significantly larger than the space requirement of the stacked electrodes.

Also, in this case, however, an exact positioning of the electrodes and insulators under one another is relatively complex. Moreover, there is the danger that over time, shifting between the individual elements can occur if the guide rods are not screwed down firmly enough. This danger is further increased by the fact that when pulse currents are diverted, elevated mechanical and thermal stresses occur, which can cause shifting between the individual elements. If the guide rod is screwed down or pulled excessively, however, twisting within electrodes that are produced on the basis of graphite can occur, which can have an unfavorable effect on the diversion capacity, the insulation strength, as well as the secondary current quenchability of the spark gaps. The cost of installing and arranging the individual electrodes and insulators is correspondingly increased in this case when multiple stack spark gaps are to be arranged in a surge protection system or a surge protection device.

SUMMARY OF THE INVENTION

The object of this invention is therefore to indicate a holding arrangement for multiple electrodes, by which multiple stack spark gaps can be built up in a simple and reproducible way. In this case, as high a flexibility as possible relative to the number of electrodes of a stack spark gap is to be provided.

This object is achieved in the case of the above-described holding arrangement in such a way that in the individual holding frames, at least two recesses are formed next to one another in each frame, whereby each of the recesses is used to accommodate a respective electrode, for which purpose the contour of the individual recesses is matched to the outside dimensions of the individual electrodes. In order to be able to easily position the individual holding frames that can be stacked flat one on top of another, the individual holding frames can be connected to one another mechanically.

The holding arrangement according to the invention, which comprises multiple holding frames that can be stacked one on top of another and that can be locked together, is thus distinguished first of all in that the individual holding frames are designed not only to accommodate an electrode, but also to accommodate at least two electrodes, preferably three electrodes, for which purpose a corresponding number of recesses for the individual electrodes are formed in the individual holding frames. Thus, 15 electrodes can be arranged in a holding arrangement that is formed of, for example, five holding frames, which in each case has three recesses, whereby in each case, five electrodes that are arranged one on top of another form a stack spark gap, so that three stack spark gaps that are arranged parallel to one another can be built up with such a holding arrangement. Because of the stackability, in this case great flexibility relative to the number of holding frames is possible, which frames form a holding arrangement. The number of holding frames is freely selectable depending on the application and operating conditions.

According to a preferred configuration of the holding arrangement according to the invention, in each case, a number of openings corresponding to the number of recesses are formed in the individual holding frames, which openings are connected to a respective recess, so that an electrode that is arranged in a recess can be contacted from the outside through the opening. In this case, the opening can optionally be sized so that components for controlling the electrical behavior of the individual stack spark gaps are also arranged completely or partially in the opening. Preferably, the openings are sized so that spring contacts through the openings contact the individual electrodes, whereby the spring contacts on the side that faces away from the electrodes are connected with a switch or corresponding components, for example components for controlling the ignition behavior.

Preferably, in this case, the openings are formed on at least one longitudinal side of the holding frame, so that the switches or the components, which contact the electrodes, can be arranged adjoining the longitudinal side of the holding frame. In this case, it is especially advantageous when all openings are arranged on one longitudinal side of the holding frame, since then the components for contacting the electrodes can be arranged especially simply on a common switch or a common printed circuit board that is positioned adjoining the longitudinal side of the holding frame.

At the outset, it was explained that in the case of the holding arrangement according to the invention, the individual holding frames can be positioned simply relative to one another by ensuring that the holding frames can be connected to one another. There are various possibilities relative to the configuration of the connection between the individual holding frames. For example, each of the holding frames can have at least one latching element on the front and at least one corresponding mating latching element on the rear, so that the latching element of a holding frame engages in a mating latching element of a second holding frame when the two holding frames are stacked one on top of another. For example, pin-shaped studs or projections as latching elements and mortises or recesses corresponding thereto as mating latching elements can be formed on the sides that are opposite to one another—front and rear—of the holding frames.

According to an especially preferred configuration of the holding arrangement, in each case a projection and, adjacent thereto, a set-back are formed on at least one side of the holding frame, whereby the projection extends above the plane of the holding frame in the direction of the adjacent holding frame and extends above the corresponding set-back of the adjacent holding frame when two holding frames are stacked one on top of another. In each case, a projection and a set-back are preferably formed here not only on one side of the holding frame, but rather on two sides that are opposite to one another, in particular on the two sides of the holding frame, so that a type of interlacing is produced by the interlocking of projections and set-backs of adjacent holding frames, which interlacing keeps the holding frames from sliding under one another.

So that the holding frames cannot slip relative to one another in the plane of the holding frames, preferably also at least one projection and, adjacent thereto, a set-back are formed on at least one longitudinal side. The projections on the longitudinal sides and the projections on the ends in this case preferably extend in opposite directions above the plane of the holding frames. By this type of interlacing, in addition, an exact positioning of the individual holding frames relative to one another is ensured, without the stacking of the holding frames being hampered.

In order to further simplify the stacking or joining together of the individual holding frames, gripping surfaces are preferably made on the individual projections, so that a holding frame can be easily gripped with two fingers by a mechanic and can be connected to another holding frame.

As has been explained above, individual stack spark gaps in general consist not only of multiple electrodes that are arranged one on top of another, but, moreover, also of multiple insulators, which are arranged between the individual electrodes. Therefore, the holding frames of the holding arrangement according to the invention have an at least partially circumferential edge which, according to an especially preferred configuration, is used as a seating for at least one frame-shaped insulator. Relative to the at least partially circumferential edge, the recesses are arranged set back in the holding frame, so that the frame-shaped insulator primarily rests on the edge and not on the electrodes that are arranged in the recesses. As a result, the position of the frame-shaped insulator is determined by the holding frame and is not dependent upon possible tolerances relative to the arrangement of the electrodes in the recesses. Since the edge is used as a seating for the frame-shaped insulator, it is not necessary that the edge is made completely circumferential. Gaps can thus be arranged in the edge, for example produced by the openings that are formed in the holding frame for contacting the electrodes.

For simple and exact positioning of the individual holding frames relative to one another, the above-described variants of the latching, in particular the forming of projections and set-backs, are sufficient. In order to connect the individual holding frames permanently and securely to one another, fastening elements are preferably provided, in which these can be screws or bolts. For arranging or accommodating at least one fastening element, in each case at least one hole for creating the fastening element is arranged in the individual holding frames. The holes in the individual holding frames are in this case aligned relative to one another when the holding frames are stacked one on top of another, i.e., the holes are formed at the same position in all holding frames. Preferably, in this case, at least two holes are formed in the individual holding frames, which holes are arranged in the sections of the holding frames between two recesses.

According to a final advantageous further development of the invention, which in addition is to be briefly explained here, at least one hole on one side (front or rear) of the holding frame is surrounded by a ring-shaped groove. On the opposite side (rear or front) of the holding frame, a ring-shaped projection subsequent to the hole is then formed, which projection extends above the plane of the holding frame in the direction of the adjacent holding frame, so that the ring-shaped projection engages in the ring-shaped groove of the adjacent holding frame when two holding frames are stacked one on top of another. Because of such a configuration, an interlacing of the holes of adjacent holding frames relative to one another is also carried out, thus ensuring that the reliable positioning of the individual holding frames relative to one another is further enhanced. In addition, the design of ring-shaped groove and ring-shaped projection on the holes produces an increase in air and creep distances.

In addition to a holding arrangement for multiple electrodes, this invention also relates to an arrangement of at least two stack spark gaps, which in each case have multiple electrodes and frame-like insulators that are arranged between the electrodes. In the case of such an arrangement, the above-mentioned object is achieved with the features of claim 10, in such a way that the individual electrodes and the individual insulators are arranged in the holding frame of the holding arrangement according to the invention. In this case, one electrode per stack spark gap and one insulator are respectively arranged in a holding frame, and multiple holding frames are stacked one on top of another. If this is an arrangement of, for example, three stack spark gaps, three electrodes and at least one insulator are arranged in each holding frame. In this case, the electrodes are arranged respectively in the recesses in the holding frame, while the insulator is accommodated in at least one partially circumferential edge of the holding frame.

Relative to the advantages of such an arrangement of at least two, preferably three, stack spark gaps, reference is made to the above-described advantages in connection with the holding arrangement according to the invention.

In principle, in the individual holding frames, a number of individual insulators corresponding to the number of electrodes could be provided, so that a separate frame-shaped insulator is to be assigned to each electrode. Preferably, however, in each case, only one frame-shaped insulating film is provided for each holding frame as insulation, in which film a number of recesses corresponding to the number of electrodes is formed, which recesses are arranged corresponding to the individual electrodes. By using only one frame-shaped insulating film instead of multiple individual insulators for each holding frame, the assembly of the arrangement is further simplified.

The insulating film preferably is made of a plastic, for example, PTFE, and has a relatively small thickness of preferably less than 1 mm, in particular less than 0.5 mm. In principle, however, other insulating materials for the insulating film are also possible. Likewise, the insulating film can also have a somewhat larger thickness, so that the insulating film then can also be referred to as an insulating disk or insulation plate. The term insulating film is thus to be limited neither to specific materials nor to a specific thickness.

In general, there are a large number of possibilities for further developing and configuring the holding arrangement according to the invention as well as the arrangement of at least two stack spark gaps. To this end, reference is made to the description of preferred embodiments in conjunction with the accompanying drawings.

DETAILED DESCRIPTION OF THE INVENTION

Figure 1:
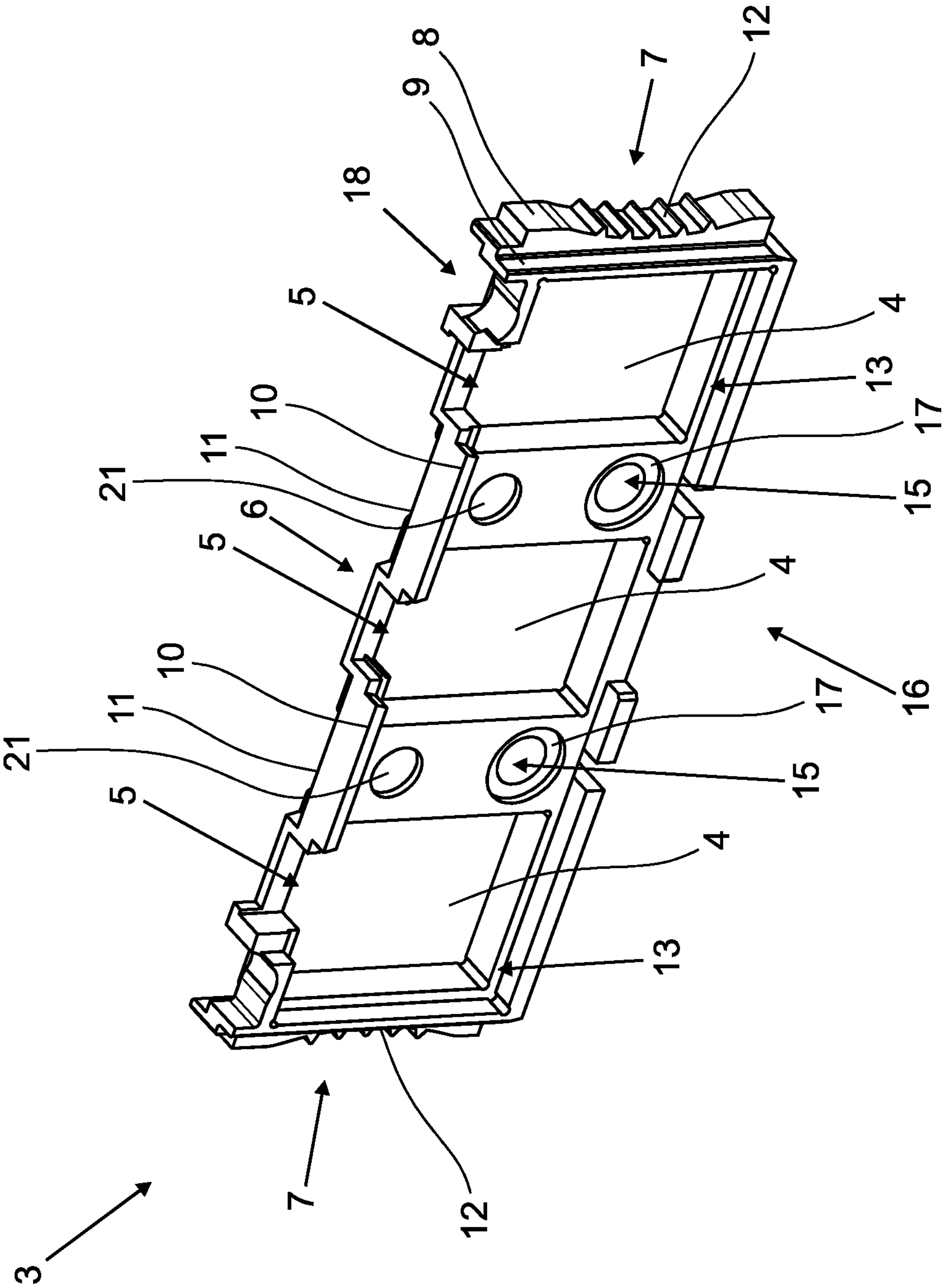
FIG. 1 is a perspective view of an embodiment of an individual holding frame of a holding arrangement.
Figure 4:
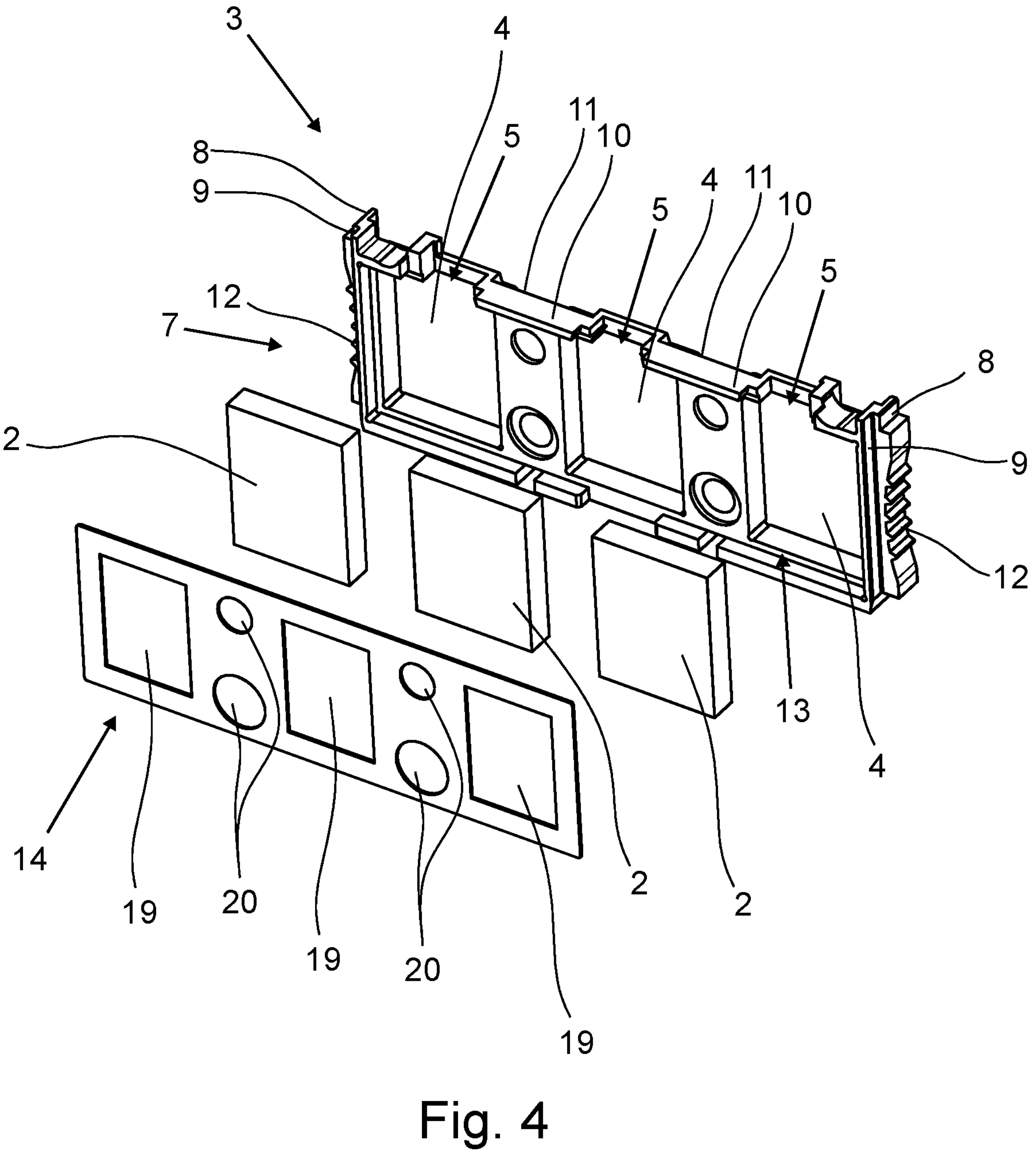
FIG. 4 is an exploded view of the holding frame according to FIG. 1 with three electrodes and an insulating film.

The figures show a holding arrangement 1 for multiple electrodes 2, whereby the holding arrangement 1 has at least two holding frames 3, which are stacked flat one on top of another. Such an individual holding frame 1 is depicted in FIG. 1. The holding frame 3 has three recesses 4, so that three electrodes 2 can also be accommodated by the holding frame 3, namely in each case one electrode 2 per recess 4. The three recesses 4 are in this case arranged next to one another in a plane and in each case have a contour that is matched to the outside dimensions of the individual electrodes 2, as evident from FIG. 4.

Figure 2:
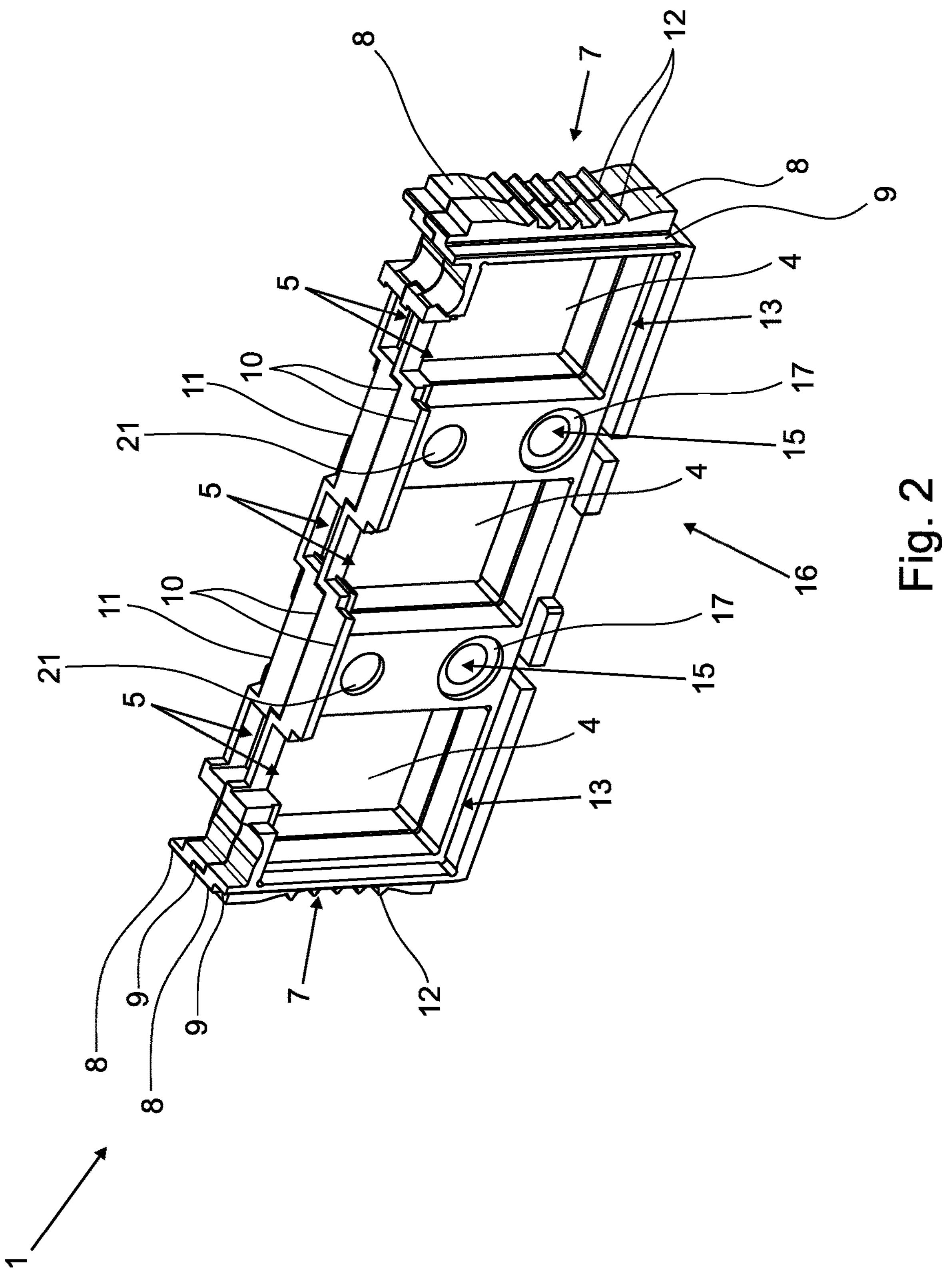
FIG. 2 is a perspective view of two holding frames that are latched together and that together form a holding arrangement.

FIG. 2 shows a holding arrangement 1 that is composed of two holding frames 3, so that altogether six electrodes 2 can be accommodated by this holding arrangement 1. The individual holding frames 3 in each case have a number of openings 5 corresponding to the number of recesses 4, so that in the holding frame 3 that is depicted in the figures, in each case three openings 5 are formed in the holding frames 3. It is evident both from FIG. 1 and from FIG. 2 that in each case, an opening 5 is connected to a recess 4, i.e., the opening 5 connects directly to the recess 4, so that an electrode 2 that is arranged in a recess 4 can be contacted through the opening 5. Thus, through the opening 5, an electrode 2 can be electrically connected with a switch or a component for controlling or for igniting a spark gap between two electrodes 2 that are stacked one on top of another. In this case, the openings 5 are preferably formed on a longitudinal side 6 of the holding frame 3, so that the contacting of the individual electrodes 2 can be carried out especially simply from this side.

In order to be able to connect the individual holding frames 3 to one another or to latch them, in each case a projection 8 and, adjacent thereto, a set-back 9 are formed on the two front sides 7 of the holding frame 3. The projections 8 in this case extend above the plane of the holding frame 3 in the direction of the adjacent holding frame 3. In the depiction according to FIG. 1, the projections 8 extend above the plane of the holding frame 3 toward the rear, so that the projections 8 extend above the corresponding set-backs 9 of the adjacent, rear holding frame 3 when two holding frames 3 are stacked one on top of another according to FIG. 2.

In addition to the projections 8 that are formed on the two ends 7 of the holding frame 3, the holding frame 3 also has two projections 10 on a longitudinal side 6, adjacent to which projections in each case a set-back 11 is formed. In the depiction according to FIG. 1, the two projections 11 in this case extend above the plane of the holding frame 3 toward the front and thus opposite to the projections 8. If two adjacent holding frames 3 are stacked one on top of another, the projections 10 of one holding frame 3 extend above the set-backs 11, designed corresponding thereto, on the same longitudinal side 6 of the other holding frame 3, as is evident from FIG. 2. With this arrangement, the projections 8 of the front holding frame 3 thus extend above the set-backs 9 that are formed on the front sides 7 of the rear holding frame 3, while the projections 10 of the rear holding frame 3, which are made on the longitudinal side 6, extend above the corresponding set-backs 11 of the front holding frame 3 or engage in the set-backs 11. As a result, a reliable fastening of the individual holding frames 3 to one another is ensured in a simple way, so that the latter can no longer be shifted against one another in the plane of the holding frames 3. The holding frames 3 are thus interlaced in one another by the forming of the projections 8, 10 and the set-backs 9, 11.

For simple handling of the individual holding frames, gripping surfaces 12 are made on the projections 8, which are formed on the front sides 7, so that a holding frame 3 can be easily grasped with two fingers by a mechanic. In this way, the stacking of the individual holding frames 3 one on top of the other is further simplified.

Figure 3:
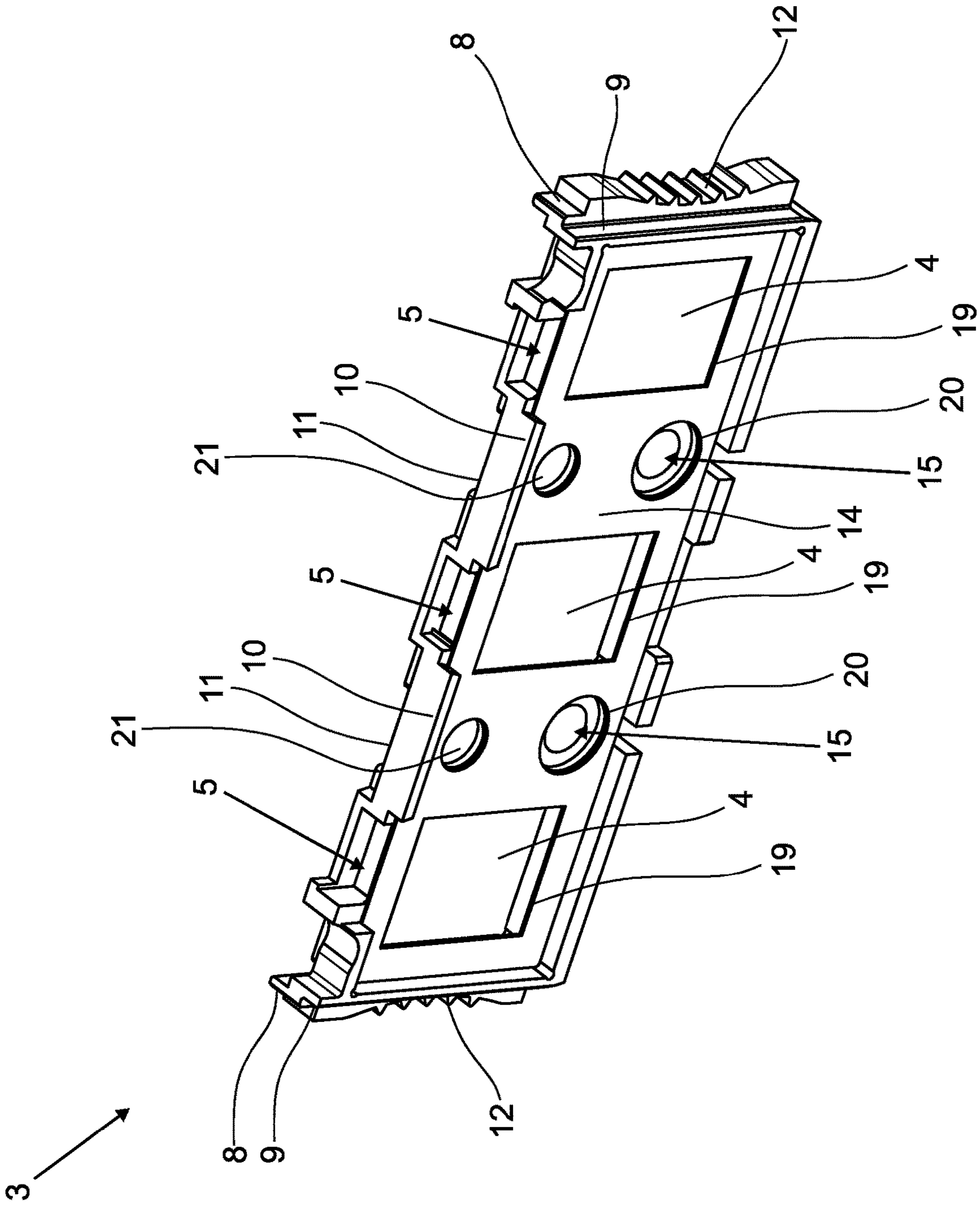
FIG. 3 shows the holding frame according to FIG. 1 with an insulating film that is inserted therein.

As is evident in particular from looking at FIGS. 1 and 3, a holding frame 3 has a partially circumferential edge 13, relative to which the recesses 4 are set back. In this case, the edge 13 is only partially circumferential, since it is interrupted at least in the area of the openings 5. However, this is irrelevant for the function of the edge 13, which is used as a seating for a frame-like insulator 14. In the depiction according to FIG. 3, the frame-like insulator 14 is inserted into the holding frame 3, so that in the case of two holding frames 3 that are stacked on one another, the insulator 14 is arranged between in each case two stacked electrodes 2 that are arranged in the holding frame 3. With the holding arrangement 1, depicted in FIG. 2, in which only two holding frames 3 are stacked one on top of another, three spark gaps that are arranged next to one another can thus be produced, whereby one spark gap in each case is formed by two electrodes 2 that are arranged behind one another and the insulator 14 that is arranged between the electrodes 2.

So that the individual holding frames 3 of the holding arrangement 1 can also be attached to one another perpendicular to the plane of the holding frames 3, in each case multiple holes 15 are arranged in the individual holding frames 3 for creating corresponding fastening elements (not depicted), whereby the holes 15 in the individual holding frames 3 align relative to one another when the holding frames 3 are stacked one on top of another. As fastening elements, in particular screws or rivets can be used. As is evident, for example, from FIG. 1, two holes 15 on one side, namely the front 16, of the holding frame 3 are in each case surrounded by a ring-shaped groove 17. On the other side, i.e., the rear 18 of the holding frame 3, a corresponding ring-shaped projection connects for this purpose to the holes 15, which projection—similar to the projections 8—extends above the plane of the holding frame 3, so that the ring-shaped projections engage in the corresponding ring-shaped grooves 17 when two holding frames 3 are stacked one on top of another.

Moreover, the holding frames 3 have two additional recesses 21—seen from the front 16—which form additional projections on the rear 18, which extend above the plane of the holding frame 3. In the case of holding frames 3 that are stacked one on top of another, the recesses 21 and corresponding projections of two adjacent holding frames 3 engage in one another.

Figure 5:
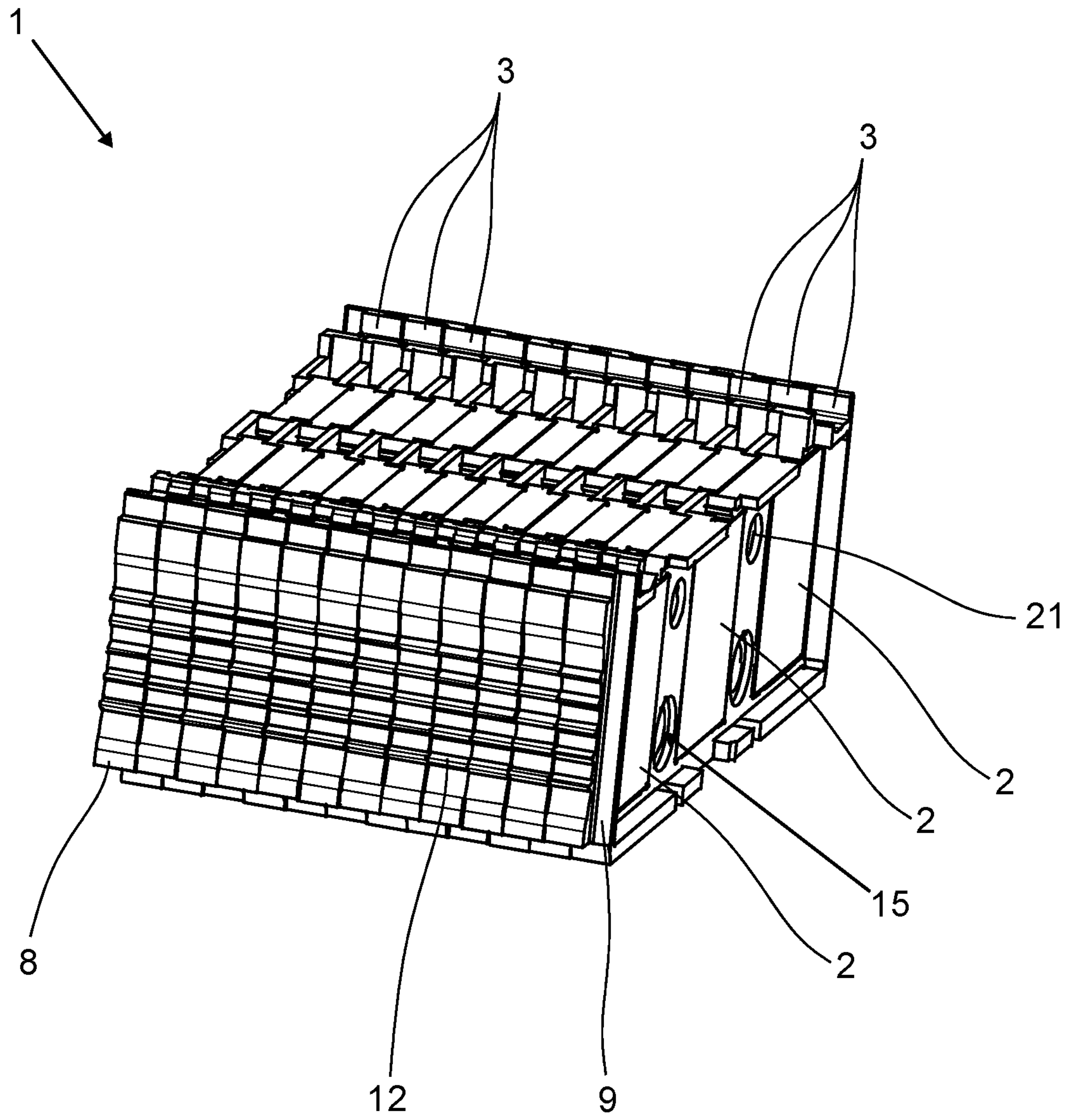
FIG. 5 is a perspective view of an embodiment of an arrangement of three stack spark gaps in a holding arrangement.

FIG. 5 shows an arrangement of three stack spark gaps that are arranged next to one another and that are arranged in a holding arrangement 1 according to the invention, whereby the holding arrangement 1 in the depicted embodiment is formed of 12 holding frames 3 that are stacked one on top of another. In each holding frame 3, three electrodes 2 and one frame-like insulator 14 are arranged. The three stack spark gaps thus in each case have 12 electrodes 2, so that the individual stack spark gaps have 11 spark gaps that are connected in series.

Since, in each case, only one insulator that is designed as insulating film 14 is arranged in the individual holding frames 3, the individual insulating films 14 in each case have a number of recesses 19 corresponding to the number of electrodes 2, which are arranged corresponding to the electrodes 2 or to the recesses 4 in the holding frame 3. In the depicted embodiment of a holding frame 3, which is provided for accommodating three electrodes 2, three recesses 19 are thus also arranged in the insulating film 14, as is evident from FIG. 4. Moreover, the depiction in FIG. 4 can also be removed in that holes 20 are formed even in the insulating film 14, through which holes corresponding fastening elements can be created. The holes 20 are, in this case, arranged in such a way that they align with the holes 15 in the holding frame 3 when the insulating film 14 is inserted into the holding frame 3.

The invention claimed is:

1. A holding arrangement for multiple electrodes, comprising:

at least two holding frames which can be stacked flat and connected together one on top of another, wherein at least two recesses are formed next to one another in each of the holding frames, each of the at least two recesses accommodating one electrode, and wherein the contour of the individual recesses is matched to the outside dimensions of the electrodes.

2. The holding arrangement according to claim 1, wherein in each of the holding frames, a number of openings corresponding to the number of recesses are formed, wherein each opening is connected to a respective one of the recesses, so that an electrode that is arranged in a recess can be contacted through the opening.

3. The holding arrangement according to claim 2, wherein the openings are formed on at least one longitudinal side of the holding frame.

4. The holding arrangement according to claim 1, wherein on at least one end of the holding frames, in each case a projection and an adjacent set-back are formed, whereby the projection extends above a plane of the holding frame in a direction of the adjacent holding frame and extends above the set-back of the adjacent holding frame when two holding frames are stacked one on top of another.

5. The holding arrangement according to claim 4, wherein a gripping surface is formed on the projections.

6. The holding arrangement according to claim 1, wherein each of the holding frames has at least one latching element on a front side and at least one corresponding mating latching element on a rear side, so that a latching element of a holding frame engages in a mating latching element of a second holding frame when the two holding frames are stacked against one another in a front to back relationship.

7. The holding arrangement according to claim 1, wherein the holding frames have an at least partially circumferential edge, relative to which the recesses are set back, whereby the at least partially circumferential edge provides a seat for at least one frame-like insulator.

8. The holding arrangement according to claim 1, wherein each of the holding frames is provided with at least one hole that is arranged for passing a fastening element, whereby said at least one hole of one holding frame aligns the at least one hole of another holding frame when the holding frames are stacked one on top of another.

9. The holding arrangement according to claim 8, wherein at least one hole on one side of the holding frame is surrounded by a ring-shaped groove and on the other side of the holding frame, a ring-shaped projection connects to the hole, the projection extending beyond a plane of the holding frame in a direction of an adjacent holding frame and engages in the ring-shaped groove of the adjacent holding frame when two holding frames are stacked one against another.

10. An arrangement of at least two stack spark gaps, which in each case have multiple electrodes and frame-like insulators that are arranged between the electrodes, wherein individual electrodes and individual insulators are arranged in a holding frame of a holding arrangement comprising at least two holding frames which can be stacked flat and connected together one on top of another, and wherein at least two recesses are formed next to one another in each of the holding frames, each of the at least two recesses accommodating one electrode, and wherein the contour of the individual recesses is matched to the outside dimensions of the electrodes, whereby in each case, one electrode per stack spark gap and one insulator are arranged in one holding frame, and multiple holding frames are stacked one against another.

11. The arrangement according to claim 10, wherein, in each case, at least two electrodes and at least one insulator are arranged in each of the holding frames, wherein the electrodes are arranged in each case in a recess in the holding frame, and the insulator is arranged in an at least partially circumferential edge of the holding frame.

12. The arrangement according to claim 11, wherein the insulator for each holding frame comprises a frame-shaped insulating film in which a number of recesses corresponding to the number of electrodes are formed, and wherein the recesses are configured and arranged corresponding to the electrodes.

* * * * *